(12) United States Patent
Tuma

(10) Patent No.: US 10,253,793 B2
(45) Date of Patent: Apr. 9, 2019

(54) FASTENING DEVICE

(71) Applicant: GOTTLIEB BINDER GMBH & CO. KG, Holzgerlingen (DE)

(72) Inventor: Jan Tuma, Herrenberg (DE)

(73) Assignee: GOTTLIEB BINDER GMBH & CO. KG, Holzgerlingen (DE)

( * ) Notice: Subject to any disclaimer, the term of this patent is extended or adjusted under 35 U.S.C. 154(b) by 18 days.

(21) Appl. No.: 15/547,819

(22) PCT Filed: Jan. 21, 2016

(86) PCT No.: PCT/EP2016/000107
§ 371 (c)(1),
(2) Date: Aug. 1, 2017

(87) PCT Pub. No.: WO2016/124314
PCT Pub. Date: Aug. 11, 2016

(65) Prior Publication Data
US 2018/0031016 A1 Feb. 1, 2018

(30) Foreign Application Priority Data

Feb. 3, 2015 (DE) .......................... 10 2015 001 335

(51) Int. Cl.
*F16B 5/07* (2006.01)
*E04F 13/08* (2006.01)

(52) U.S. Cl.
CPC ............ *F16B 5/07* (2013.01); *E04F 13/0882* (2013.01); *Y10T 428/24008* (2015.01); *Y10T 428/24017* (2015.01)

(58) Field of Classification Search
CPC ..... Y10T 428/24008; Y10T 428/24017; F16B 5/07; F16B 21/086; F16B 21/088; F16B 2005/0678; F16B 2005/0685; A44B 18/0046
See application file for complete search history.

(56) References Cited

U.S. PATENT DOCUMENTS

| 4,342,139 A | 8/1982 | Tanaka |
| 2008/0229556 A1 | 9/2008 | Hammer |

FOREIGN PATENT DOCUMENTS

| DE | 10 2008 007 913 | 8/2009 |
| DE | 10 2010 027 394 | 1/2012 |
| EP | 0 465 983 | 1/1992 |
| EP | 0 466 504 | 1/1992 |

OTHER PUBLICATIONS

International Search Report (ISR) dated Mar. 15, 2016 in International (PCT) Application No. PCT/EP2016/000107.

*Primary Examiner* — Alexander S Thomas
(74) *Attorney, Agent, or Firm* — Wenderoth, Lind & Ponack, L.L.P.

(57) ABSTRACT

A fastening device has a supporting part (9), adhesive fastening elements (25) attached to the supporting part and protruding from the supporting part (9), a shaft part (27) protruding beyond the supporting part (9), and at least one elastically resilient hooking part (19). Each hooking part (19) extends outward away from the shaft part (27) or a holding part (29) for the hooking part (19) in an initial position, forming an intermediate space (30), which is reduced as soon as the hooking part (19) is moved toward the shaft part (27) or the holding part (29) under the influence of an external application of force.

16 Claims, 6 Drawing Sheets

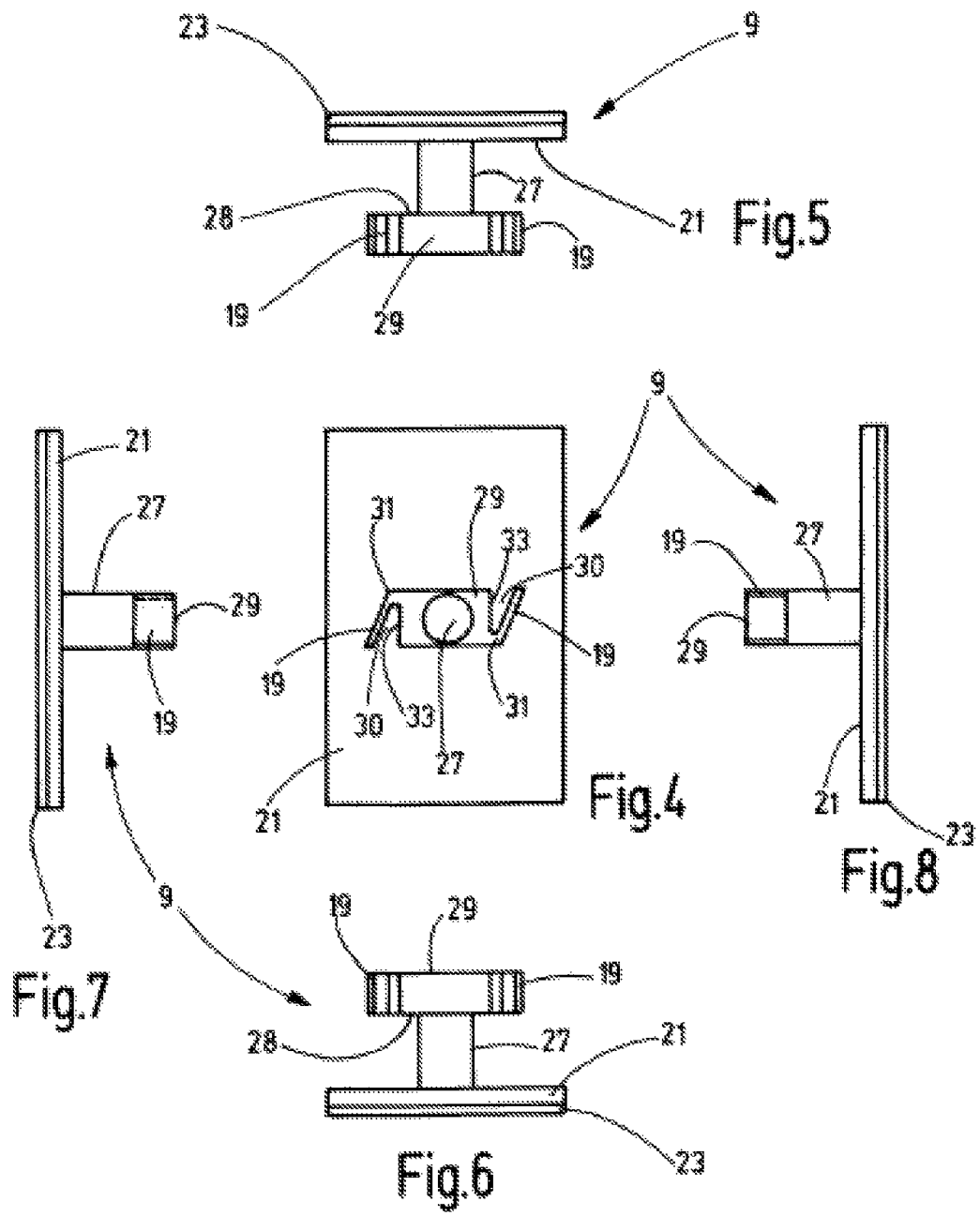

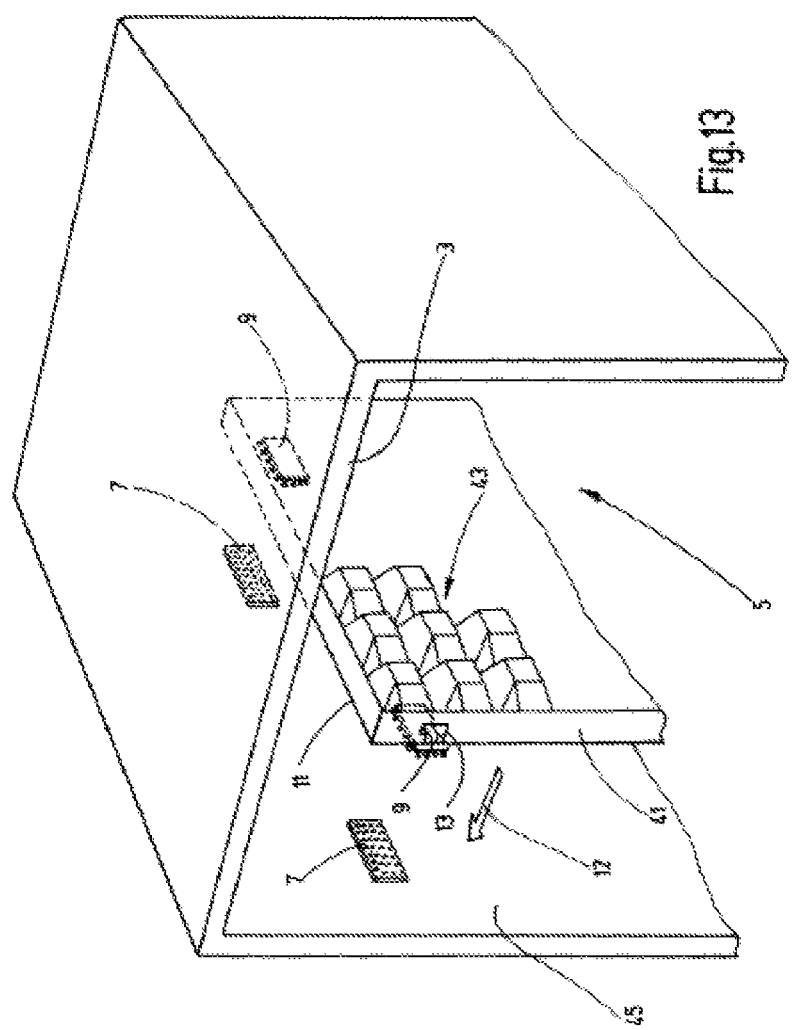

FASTENING DEVICE

FIELD OF THE INVENTION

The invention relates to a fastening device comprising a support part and adhesive fastening elements attached to and protruding from the support part. A shaft part protrudes beyond the support part and is connected to at least one elastically resilient hooking part.

BACKGROUND OF THE INVENTION

Fastening devices, which fix objects or components to third components by forming adhesive connections, are prior art in a wide variety of arrangements. The documents DE 10 2008 007 913 A1 or DE 10 2010 027 394 A1, for example, disclose fastening devices, which may be used to fix third components at predefinable points on components, whether they are parts of motor vehicles, trains, ships or of aircraft. In the case of motor vehicles, such third components may be, for example, covers on body parts, panels or other flat coverings. In the case of buildings, such fastening devices may also serve to fix flat coverings, such as panels or textile sheets at predefinable points, for example, to conceal unsightly locations or to also form a thermal insulation and/or sound insulation.

Because the connection between the relevant component and the third component to be fixed thereto is achieved not by screw fastening, riveting or nailing, but by way of an adhesive connection by adhesively engaging adhesive fastening elements that are connected to a component to corresponding adhesive fastening elements on the respective third component, the result is, for one, a substantial reduction of the assembly effort and, for another, the particular advantage that position tolerances between the component and the third component may be compensated for during manufacture of the adhesive connection. To enable a simple and economical assembly when using such fastening devices, the support part provided with adhesive fastening elements in a fastening device of the aforementioned kind disclosed in DE 10 2010 010 893 A1 is provided with a protruding shaft part, which includes elastically resilient hooking parts with which the support part may be clipped into a fastening hole on the associated component.

SUMMARY OF THE INVENTION

An object of the invention is to provide an improved fastening device of this type, which is distinguished, in particular, by universal applications.

According to the invention, this object is basically achieved by a fastening device including respective hooking parts in an initial position that extend outwardly away from the shaft part and/or from a holding part for the respective hooking part while forming an intermediate space. The intermediate space is reduced as soon as the respective hooking part moves toward the shaft part and/or holding part under the influence of an external application of force. Because the hook elements, in contrast to the cited known solution, are thus formed not as nubs with no intermediate space deflecting into the shaft, but rather as a type of wings, which extend outwardly from the shaft or holding part in the unloaded initial position while forming an intermediate space, the attachment to the assigned component is not limited to the presence of a correspondingly positioned matching fastening hole. Instead, it opens the possibility of designing hook positions more freely in terms of dimensioning as well as shape, so that the hooks may be engaged not only point by point, but also in positions variable in the desired direction. The hooks may be engaged, for example, by inserting them in the opening of a profile engageable from behind extending in one direction, so that the invention offers particularly universal applications.

The arrangement may be such that at least one part of the hooking parts extends away on the outer circumferential side starting directly from the shaft part. Alternatively, the holding part situated on the shaft part can support at least one hooking part.

In exemplary embodiments, in which a holding part for respective hooking parts is situated on the shaft part, preferably on the free end thereof, the holding part may have a block-shaped or rectangular-shaped design and may extend with its longitudinal axis or transverse axis perpendicular to the longitudinal axis of the shaft part. The vertical axis of the holding part preferably coincides with the longitudinal axis of the shaft part.

The holding part may particularly advantageously include two opposing hooking parts, as viewed diametrically to the longitudinal axis of the shaft part. The hooking parts situated opposite one another on both front sides of the holding part preferably face in opposite directions.

In particularly advantageous exemplary embodiments having hooking parts situated on the front sides of the holding part, the hooking parts are advantageously situated such that the respective intermediate space, which is bound by at least one front side of the holding part as well as by the hooking part assigned to this front side, tapers in the direction of a connection point between the holding part and the hooking part.

To maintain the elastically resilient property of every hooking part, the connection point with the holding part extends preferably across the entire front side of the block-shaped or rectangular-shaped holding part. The connection point has a wall thickness, which preferably corresponds to one to three times the thickness of the hooking part.

In this case, the arrangement may be advantageously such that the respective wing-like hooking part lies within the imaginary continuous side surfaces of the block-shaped or rectangular-shaped holding part, fitting flush with these imaginary side surfaces in each case. Thus, in the case of a connection point located in a corner area of the assigned front side of the holding part, the length of the wing formed by the hooking part corresponds to the width of the front side.

The preferably cylindrical shaft part, the preferably plate-shaped support part and the block-shaped or rectangular-shaped holding part with its wing-like hooking part may be advantageously formed as one piece, preferably from plastic material. The adhesive fastening elements are adhesively connected or melted to the support part.

The subject matter of the invention is also a fastening system, which includes at least one of fastening device according to the invention.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 4 is a bottom view of the support part of FIG. 2;

FIGS. 5 and 6 are views of the two opposing front sides of the support part of FIG. 4;

FIGS. 7 and 8 are views of the opposing longitudinal sides of the support part of FIG. 4;

FIG. 13 is a partial perspective angular view of a modified embodiment of the fastening system according to the invention.

DETAILED DESCRIPTION OF THE INVENTION

Figure 1:
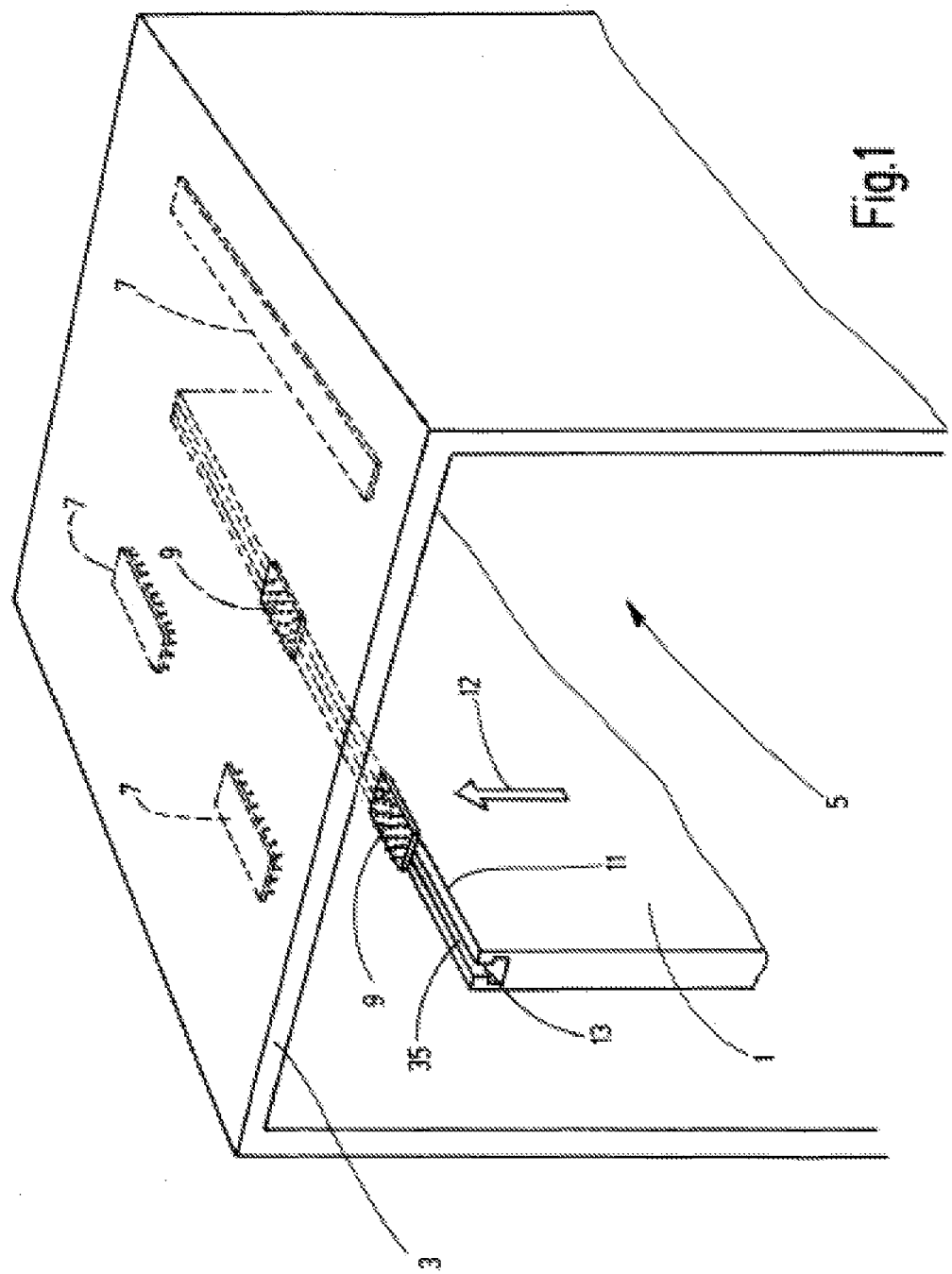
FIG. 1 is a partial perspective view of a fastening system according to an exemplary embodiment of the invention in the manner of a schematically simplified functional sketch.

FIG. 1 illustrates an exemplary embodiment, in which the fastening system according to the invention is used for the purpose of attaching a flat panel 1 to the ceiling 3 in a room 5 of a building, not depicted. The fastening device according to the invention forms adhesive connections. For this purpose, two adhesive fastening elements 7 are attached to the ceiling 3 to form connection areas. Fastening element 7 adhesively engage with support parts 9 of the fastening device according to the invention, when the panel 1 with its straight upper edge 11 is applied to the ceiling 3 in the direction of a movement arrow 12. In the example shown, only two adhesive fastening elements 7 with assigned support parts 9 for forming the connection areas are shown in the simplified depiction of FIG. 1. A larger number of connection points having a corresponding plurality of support parts 9 and assigned adhesive fastening elements 7 may be provided. An elongated adhesive fastening element 7 may likewise be provided as indicated in FIG. 1 and extends essentially over the entire length of a component to be attached, such as a panel 1, to adhesively engage with a corresponding number of support parts 9. The details of the design of the support parts 9 may be seen in FIGS. 2 through 10. The manner of attachment of the support parts 9 to the panel 1 is apparent from FIGS. 11 and 12.

Figure 2:
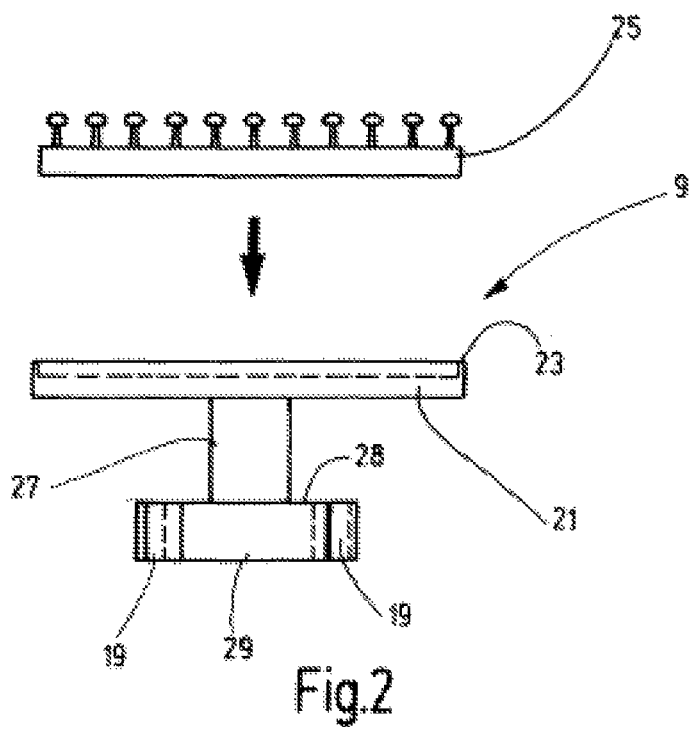
FIG. 2 is an exploded side view drawn in approximately double the size of a practical embodiment, of the support part provided as the fastening device for the fastening system of FIG. 1, including adhesive fastening elements to be attached thereto, the adhesive elements of which are likewise depicted schematically simplified as mushroom heads.
Figure 3:
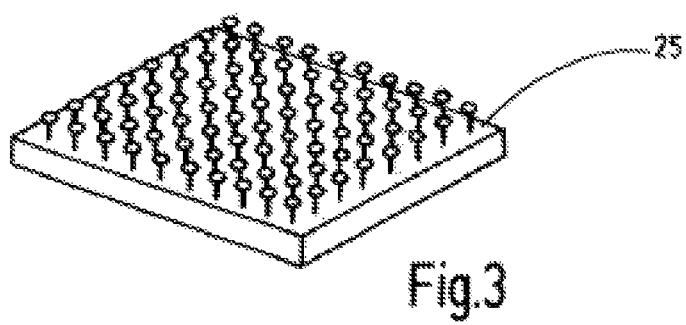
FIG. 3 is a perspective angular view of the separately depicted adhesive fastening elements of FIG. 2.
Figure 10:
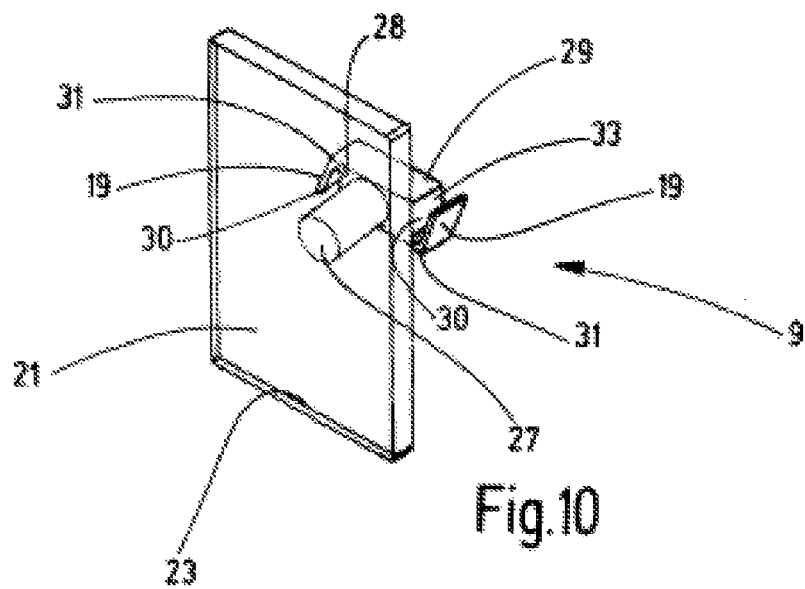
Figures 11, 12:
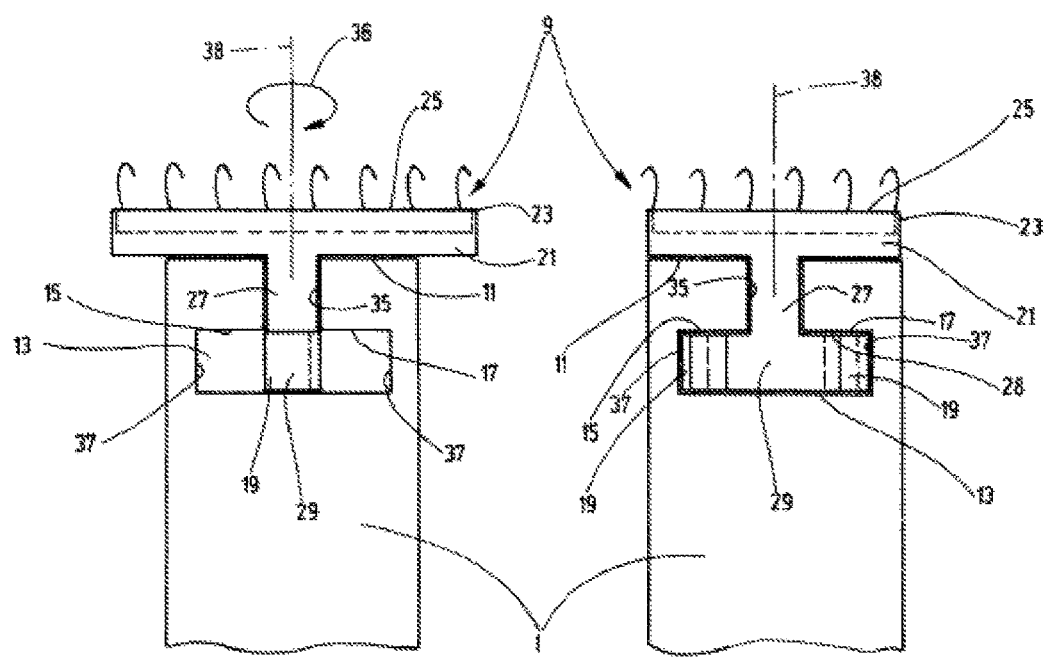
FIG. 11 shows a partial front view of the panel shown in FIG. 1 to be attached by the fastening device, including a support part located in the mounting position or initial position with highly schematized adhesive elements indicated as hooks.
FIG. 12 is a partial front view of the panel shown in FIG. 1 with the support part rotated into the functional position.

As the last-mentioned figures and FIG. 1 show, a profile channel 13 forms inner contact surfaces 15 and 17, as is most readily apparent from FIGS. 11 and 12. The respective support part 9 with hooking parts 19 of the respective support part 9 may be anchored to the contact surfaces 15, 17, and is provided for anchoring the support parts 9 along the upper edge 11 of the relevant component, in this case the panel 1. The design of the support parts 9 with the hooking parts 19 may be seen in the FIGS. 2 through 10. As most clearly shown by the FIGS. 2, 4 as well as 9 and 10, the support parts 9 include a rectangular-shaped flat support plate or member 21. On the upper side of support plate 21 a slightly protruding circumferential edge 23 is located. This edge forms a surround for an adhesive fastening element 25 corresponding to the aforementioned prior art, attached by adhesive or thermal bonding. Fastening element 25 is depicted in FIG. 2 before the attachment of the support plate 21 and is depicted separately in FIG. 3. In these figures, the associated adhesive elements are indicated schematically as mushroom heads. In this case, mushroom heads form a hermaphroditic adhesive attachment and may likewise be provided on the assigned adhesive fastening elements 7 of the relevant third component. Other types of adhesive elements may be provided, for example, hooks on the support part 9, as schematically indicated in the FIGS. 11 and 12, which may interact with a fleece material on the adhesive fastening elements 7, or loops on the support parts 9 for interacting with hook elements on the adhesive attachment elements 7 or in reverse arrangement.

Figure 9:
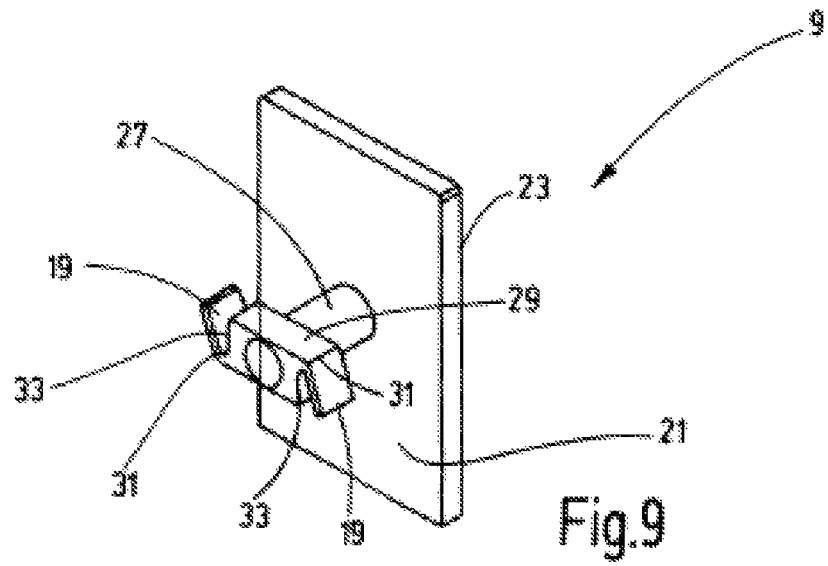
FIGS. 9 and 10 are perspective views, as seen on the bottom side and upper side of the support part, respectively.

The support parts 9 in the present example, formed from transparent plastic material, include a round cylindrical shaft part 27 in the center of the support plate 21 and protruding from the support plate at a right angle to the plate plane. The shaft part 27 forms the support for the hooking parts 19. The shaft part 27 is designed as a tube-shaped hollow body, as shown in FIGS. 4, 9 and 10. In the example shown, the hooking parts 19 are not situated directly at the free end of the shaft part 27. Rather, the hooking parts 19 are on a holding part 29 shaped as a block in the form of a rectangular cuboid. The holding part extends at the free end of the shaft part 27, with its longitudinal axis and transverse axis perpendicular to the longitudinal axis of the shaft part 27. As may most clearly be seen from the FIGS. 4 through 10, the hooking parts 19 are molded onto the holding part 29 at connection points 31, which are situated diametrically opposite one another on the holding part 29. The hooking parts 19 in this case are designed as wings of equal shape and size, which wings, as is most readily apparent from FIG. 4 as well as 9 and 10, protrude flexibly outward in the unloaded state away from the connection points 31 serving as bending points, while forming an intermediate space 30 between the wings and the front side 33 of the holding part 29. The wings have rectangular shapes corresponding to the shape of the holding part 29, extend accordingly over the entire area of the front sides 33 of the holding part 29 and have approximately the same wing length as the facing front side 33.

FIGS. 11 and 12 illustrate the mounting process or anchoring process in the profile channel 13 of the relevant third component, such as the panel 1. FIG. 11 shows the support part 9 in an initial position with a rotational position in which the support plate 21 extends projecting laterally beyond the upper edge 11. In this rotational position, the wing-like hooking parts 19 are splayed in the longitudinal direction of the profile channel 13, so that they may be inserted together with the shaft part 27 through the profile opening 35 of the profile channel 13, see FIG. 11. The hooking parts 19, when twisted by 90° about the longitudinal axis 38, as indicated by the rotating arrow 36 in FIG. 11, come into resilient contact with the side walls 37. Side walls 37 are located in the area of the groove-shaped expansion of the profile channel 13. In the rotational position shown in FIG. 12, not only is the support part 19 with its support plate 21 flush with the outer sides of the panel 1, but the upper side 28 of the block-like holding part 29 on the shaft part 27 is also in bottom engagement with the contact surfaces 15 and 17 in the expansion of the profile channel 13. The support part 9 is then form-lockingly secured from lifting out of the profile channel 13. In this functional position, the respective support part 9 is friction-lockingly secured against displacement along the profile channel 13 by the hooking parts 19, which resiliently abut the side walls 37. For attaching to the ceiling 3, the support parts 9 can be set in the assigned positions on the third component flush or aligned with the adhesive fastening elements 7, but are secured by the friction lock against undesirable sliding movements during the mounting process. The component, in this case, panel 1, can then be reliably and effortlessly adhesively engaged with the adhesive fastening elements 7 on the third component.

FIG. 13 illustrates an embodiment of the fastening system, in which a component in the form of a wall covering 41 is to be attached by an adhesive connection and is provided to form the relevant space 5 as an anechoic chamber. This flat component has a pattern of projecting bodies known for this purpose, indicated only partially on the visible side in FIG. 13. To attach the wall covering 41 on a side wall 45 of the room, hooking elements 7 are provided on the side walls 45 for the adhesive engagement with the hooking parts 9, which are located on the rear side of the wall covering 41. The profile channel 13, provided for anchoring the hooking parts 9, extends spaced apart from the upper edge 11 in the horizontal direction at the level of the adhesive fastening parts 7 located on the side wall 45 for forming the adhesive connection when applying the wall covering 41 in the direction of the movement arrow 12. A larger number of adhesive fastening elements 7 or assigned adhesive fastening elements 9, which may be distributed over arbitrary surface areas of the wall covering 41, may be provided on the side wall 45 and/or on the rear side of the wall covering 41.

While the hooking parts 19 above are formed as identically shaped wings, which are splayed outwardly in the initial position starting from both front sides 33 of the block-shaped holding part 29, that another number or differently shaped hooking parts could alternatively be provided.

While various embodiments have been chosen to illustrate the invention, it will be understood by those skilled in the art that various changes and modifications can be made therein without departing from the scope of the invention as defined in the claims.

The invention claimed is:

1. A fastening system, comprising:
a support part including a support member and a shaft part protruding from said support member;
elastically resilient hooking parts extending outwardly away from said shaft part or a holding part coupled to said shaft part in an initial position of said hooking parts and forming intermediate spaces between said hooking parts and said shaft part or said holding part, said intermediate spaces being reduced when said hooking parts move toward said shaft part or said holding part under an influence of an external application of force;
adhesive fastening elements protruding from said support member;
a first component having a profile channel therein, said support part being clampingly fixed in said profile channel with said support member sealed to an outside of said profile channel; and
a second component having protruding adhesive fastening elements thereon detachably engaged with said protruding adhesive fastening elements on said support member.

2. A fastening system according to claim 1 wherein said support part is insertable in an initial state thereof into an opening of said profile channel such that hooking parts pass through said profile opening until reaching an end position of said support part and such that said support part is rotatable in the end position to engage said hooking parts with groove-shaped contact surfaces of said profile part.

3. A fastening system according to claim 2 wherein said support is rotatable in said profile channel when in the end position through an angle of ninety degrees about a longitudinal axis of said shaft part in a direction in which restoring forces of said hooking part contact side walls of said profile channel in an area of a groove-shaped expansion of said profile channel.

4. A fastening system according to claim 1 wherein
said first component comprises a sound-absorbing panel or curtain;
said second component comprises a building wall or a vehicle wall; and
said protruding adhesive elements on said second component extend in sheets or are arranged point by point for fixing said panel or curtain with said adhesive fastening elements on said support member to said building wall or vehicle wall.

5. A fastening system according to claim 3 wherein
a distance between a free end of said profile opening and said groove-shaped expansion of said profile channel is equal to or smaller than an axial length of said shaft part of said support part.

6. A fastening system, comprising:
a support part including a support member and a shaft part protruding from said support member;
elastically resilient hooking parts extending outwardly away from said shaft part or a holding part coupled to said shaft part in an initial position of said hooking parts and forming intermediate spaces between said hooking parts and said shaft part or said holding part, said intermediate spaces being reduced when said hooking parts move toward said shaft part or said holding part under an influence of an external application of force;
adhesive fastening elements protruding from said support member;
a first component having a profile channel therein, said support part being clampingly fixed in said profile channel with said support member sealed to an outside of said profile channel, said support part being insertable in an initial state thereof into an opening of said profile channel between ends of said profile channel such that hooking parts pass through said profile opening until reaching an end position of said support part and such that said support part is rotatable in the end position to engage said hooking parts with groove-shaped contact surfaces of said profile part; and
a second component having protruding adhesive fastening elements thereon detachably engaged with said protruding adhesive fastening elements on said support member.

7. A fastening device according to claim 6 wherein
a part of each of said hooking parts extends away from an outer circumferential side of said shaft part or said holding part.

8. A fastening device according to claim 6 wherein
said holding part is on a free end of said shaft remote from said support member and is rectangular block-shaped with longitudinal and transverse axes of said holding part being perpendicular to a longitudinal axis of said shaft part.

9. A fastening device according to claim 8 wherein
a vertical axis of said holding part is coaxial with said longitudinal axis of said shaft part.

10. A fastening device according to claim 8 wherein
said hooking parts are situated opposite one another on opposite front sides of said holding part and face in opposite directions.

11. A fastening device according to claim 10 wherein
each said intermediate space is bound by a respective front side of said holding part and the respective hooking part and tapers in a direction of a connection point between said holding part and the respective hooking part.

12. A fastening device according to claim 11 wherein
each said connection point extends across an entirety of the respective front side of said holding part to maintain an elastically resilient property of the respective hooking part with a wall thickness of each said connection point.

13. A fastening device according to claim 12 wherein
said wall thickness of each said connection point is one to three times a thickness of the respective hooking part.

14. A fastening device according to claim 8 wherein
each said hooking part is a wing-shaped and lies within a respective imaginary and continuous side surface of said holding part to lie flush with the respective side surface.

15. A fastening device according to claim 8 wherein
said shaft part is cylindrical;

said support member is plate-shaped;

said shaft part, said support part member, said holding part and said hooking parts form a one-piece, unitary structure of plastic material; and said fastening elements are adhesively bonded or melted to said support member.

16. A fastening device according to claim 6 wherein
said hooking parts are diametrically opposite one another relative to a longitudinal axis of said shaft part.

* * * * *